US012606715B2

(12) United States Patent
Ogura

(10) Patent No.: US 12,606,715 B2
(45) Date of Patent: Apr. 21, 2026

(54) AQUEOUS INK COMPOSITION FOR WRITING INSTRUMENTS

(71) Applicant: MITSUBISHI PENCIL COMPANY, LIMITED, Shinagawa-ku (JP)

(72) Inventor: Kosuke Ogura, Shinagawa-ku (JP)

(73) Assignee: MITSUBISHI PENCIL COMPANY, LIMITED, Shinagawa-ku (JP)

( * ) Notice: Subject to any disclaimer, the term of this patent is extended or adjusted under 35 U.S.C. 154(b) by 922 days.

(21) Appl. No.: 17/769,877

(22) PCT Filed: Oct. 19, 2020

(86) PCT No.: PCT/JP2020/039248
§ 371 (c)(1),
(2) Date: Apr. 18, 2022

(87) PCT Pub. No.: WO2021/085214
PCT Pub. Date: May 6, 2021

(65) Prior Publication Data
US 2022/0389250 A1     Dec. 8, 2022

(30) Foreign Application Priority Data

Oct. 28, 2019    (JP) ................................ 2019-195324

(51) Int. Cl.
C09D 11/17     (2014.01)
C09D 11/102     (2014.01)
C09D 11/18     (2006.01)

(52) U.S. Cl.
CPC ............ *C09D 11/17* (2013.01); *C09D 11/102* (2013.01); *C09D 11/18* (2013.01)

(58) Field of Classification Search
CPC .. C09D 11/16–18; C09D 11/20; C09D 11/102
See application file for complete search history.

(56) References Cited

U.S. PATENT DOCUMENTS

| | | |
|---|---|---|
| 6,511,534 B1 | 1/2003 | Mishina et al. |
| 2014/0028765 A1* | 1/2014 | Hakiri ................. C09D 11/324 |
| | | 347/100 |
| 2014/0036010 A1* | 2/2014 | Hasegawa ............ C09D 11/102 |
| | | 347/100 |

| | | | |
|---|---|---|---|
| 2017/0015854 A1* | 1/2017 | Shimizu ............... C09D 125/08 |
| 2019/0010344 A1* | 1/2019 | Ichikawa .................. C09C 3/10 |
| 2019/0211220 A1 | 7/2019 | Miyoshi et al. |

FOREIGN PATENT DOCUMENTS

| | | | | |
|---|---|---|---|---|
| EP | 3 401 368 A1 | 11/2018 | | |
| JP | 2000-265105 A | 9/2000 | | |
| JP | 2001-152060 A | 6/2001 | | |
| JP | 2002-226743 A | 8/2002 | | |
| JP | 2004-277507 A | 10/2004 | | |
| JP | 2010-150331 A | 7/2010 | | |
| JP | 2010-196035 A | 9/2010 | | |
| JP | 2011231265 A | * | 11/2011 | .......... B41J 2/17503 |
| JP | 2013-124360 A | 6/2013 | | |
| JP | 2014-024911 A | 2/2014 | | |
| JP | 2015-229708 A | 12/2015 | | |
| JP | 2017-122168 A | 7/2017 | | |
| JP | 2018168248 A | * | 11/2018 | |
| WO | WO-2011030880 A1 | * | 3/2011 | .......... B41J 2/17503 |
| WO | WO 2018/042818 A1 | 3/2018 | | |
| WO | WO 2021/085270 A1 | 5/2021 | | |
| WO | WO 2021/085294 A1 | 5/2021 | | |
| WO | WO 2021/131899 A1 | 7/2021 | | |

OTHER PUBLICATIONS

Machine English language translation of Nishikawa, JP 2018168248A, Nov. 1, 2018. (Year: 2024).*
Machine English language translation of Fushimi et al., JP 2011231265 A, Nov. 17, 2011. (Year: 2024).*
Extended European Search Report issued Jun. 23, 2023 in European Application No. 20881803.9, 3 pages.
International Search Report issued Dec. 15, 2020 in PCT/JP2020/039248 filed on Oct. 19, 2020, 3 pages.

* cited by examiner

*Primary Examiner* — Coris Fung
*Assistant Examiner* — Caroline D. Liott
(74) *Attorney, Agent, or Firm* — Oblon, McClelland, Maier & Neustadt, L.L.P.

(57)     ABSTRACT

An aqueous ink composition for writing instruments may contain colored resin particles encapsulating a pigment, wherein the ink is not repelled when the aqueous ink composition for writing instruments is used to write on a paper face attached with hand fingers or the like, and achieves a uniform density in a drawn line and excellent writing capability. An embodiment of the aqueous ink composition for writing instruments is an aqueous ink composition for writing instruments containing at least a pigment (a) and colored resin particles (A) encapsulating the pigment (a).

7 Claims, No Drawings

AQUEOUS INK COMPOSITION FOR WRITING INSTRUMENTS

CROSS-REFERENCE TO RELATED APPLICATIONS

The present application is the national stage of international application PCT/JP2020/039248, filed on Oct. 19, 2020, and claims the benefit of the filing date of Japanese Appl. No. 2019-195324, filed on Oct. 28, 2019, the content of each of which is incorporated by reference.

TECHNICAL FIELD

The present specification relates to an aqueous ink composition for writing instruments using colored resin particles encapsulating a pigment.

BACKGROUND ART

An aqueous ink containing an aqueous dispersion of pigment-encapsulated polymer particles having a predetermined average particle diameter and containing (A) a hydrophilic polymer, (B) a hydrophobic polymer, and (C) a pigment (e.g., see Patent Document 1) and an ink composition for a writing instrument formed by using a microcapsule pigment encapsulating a dye or pigment in a microcapsule wall (e.g., see Patent Document 2) have been known.

The microcapsule pigments and the like encapsulating pigments described in Patent Documents 1 and 2 described above contain in a microcapsule wall a general dye or a general pigment for which adjustment of particle diameter and particle distribution is easy. However, this aqueous ink composition for a writing instrument containing colored resin particles comprising the microcapsule pigment tends to be repelled on a paper face attached with hand grease or the like, and density in a drawn line may be uneven.

CITATION LIST

Patent Document

Patent Document 1: JP 2004-277507 A (Claims, Examples, etc.)
Patent Document 2: JP 2010-150331 A (Claims, Paragraph [0006], Examples, etc.)

SUMMARY OF INVENTION

Technical Problem

In light of the problems in the related art described above, the present disclosure is to solve these problems, and an object is to provide an aqueous ink composition for writing instruments containing colored resin particles encapsulating a pigment, which is not repelled when the aqueous ink composition for writing instruments is used to write on a paper face attached with hand grease or the like, and achieves a uniform density in a drawn line and excellent writing capability.

Solution to Problem

As a result of intensive studies in light of the above-mentioned problems, the present inventors have found that an aqueous ink composition for writing instruments for the object described above can be obtained by using at least colored resin particles encapsulating a pigment and using the same pigment, and thus has completed the present disclosure.

Thus, the aqueous ink composition for writing instruments of the present disclosure contains at least a pigment (a) and colored resin particles (A) encapsulating the pigment (a).

A content ratio of the pigment (a) to the colored resin particles (A) [(a)/(A)] is preferably 0.02 to 0.5 by mass.

A resin component of the colored resin particles (A) is preferably urethane-based.

The pigment (a) is preferably carbon black.

Advantageous Effects of Invention

According to the present disclosure, an aqueous ink composition for writing instruments containing colored resin particles encapsulating a pigment is provided which is not repelled when the aqueous ink composition for writing instruments is used to write on a paper face attached with hand grease or the like, and achieves a uniform density in a drawn line and excellent writing capability.

In the present specification, both of general explanation described above and detailed explanation described below are exemplification and explanation and do not limit the present disclosure described in the claims.

DESCRIPTION OF EMBODIMENTS

At least some embodiments of the present disclosure will be described in detail below. However, note that the technical scope of the present disclosure is not limited to the embodiments described below but includes the invention described in the claims and equivalents thereof.

The aqueous ink composition for writing instruments of the present disclosure contains at least a pigment (a) and colored resin particles (A) encapsulating the pigment (a).

Pigment (a)

The type of pigment (a) that can be used in the present disclosure is not particularly limited, and any pigment can be used from among inorganic and organic pigments commonly used in aqueous ink compositions for writing instruments.

Examples of the inorganic pigments include carbon black, titanium oxide, zinc oxide, iron oxide, chromium oxide, and ultramarine.

Examples of the organic pigments include azo lake, insoluble azo pigments, chelate azo pigments, phthalocyanine pigments, perylene and perinone pigments, anthraquinone pigments, quinacridone pigments, lake dyes, nitro pigments, and nitroso pigments. One type of these may be used alone, or a combination of two or more types of these may be used.

As the preferred pigment (a), carbon black is desired from the perspective of making the effect of the present disclosure superior.

The content of the pigment (a) is preferably 0.1 to 8 mass %, more preferably 0.2 to 4.0 mass %, and particularly preferably 0.5 to 4.0 mass %, with respect to the total amount of the ink composition.

When the content of the pigment (a) is less than 0.1 mass %, the effect of the present disclosure is not adequately achieved. On the other hand, when the content is greater than 8 mass %, the amount of the pigment is excessive, and color reproducibility and stability over time tend to be deteriorated.

Colored Resin Particle (A)

The colored resin particle (A) of the present disclosure is formed from, at least, a microcapsule pigment encapsulating the pigment (a) described above. It can be produced, for example, by microencapsulating a material containing at least the pigment (a) described above, specifically, enclosing it in a shell layer (shell) which is formed from a wall forming material (wall material), so as to achieve a predetermined particle size.

Furthermore, the colored resin particle (A) of the present disclosure may be formed from a microcapsule pigment encapsulating a synergist (pigment derivative) together with the pigment (a) described above. The synergist (pigment derivative) to be used is a substance used in a preferred embodiment to make it easier for the pigment (a) to be embedded in the resin particle during formation of the colored resin particle and to prevent shedding of the pigment (a) from the colored resin particle. It is a derivative having a structure similar to that of the pigment (a), and is a compound exhibiting strong interaction with the pigment (a). Furthermore, the synergist also exhibits strong interaction with a dispersant described below that is preferably used during production of the colored resin particle.

By allowing at least the synergist to be contained in addition to the pigment (a) in the colored resin particle, because the synergist has a similar structure (common backbone) as that of the pigment (a), the synergist is adsorbed onto the resin of the colored resin particle as well as adsorbed on the pigment surface, and thus the pigment (a) readily enters the resin particle, and the shedding prevention effect is achieved.

Such interaction of the synergist is believed to be van der Waals force, and it is presumed that firm and practical adsorption can be achieved due to the interaction on the entirety of a flat and wide surface of the pigment structure. Note that the synergist is conventionally used as a dispersion aid of a pigment in a liquid medium; however, in the present disclosure, by allowing the synergist to be contained together with the pigment (a) in the colored resin particle to be formed, the effect of the present disclosure can be further exhibited.

As the synergist that can be used, a synergist that is most appropriate to the used pigment (a) can be used. Specifically, commercially available products of synergists for the color of the pigment (a), for carbon black, for yellow pigments, for azo pigments, and for phthalocyanine pigments can be used. Examples of the commercially available products having acidic functional groups include Solsperse 5000 (phthalocyanine pigment derivative), Solsperse 12000 (phthalocyanine pigment derivative), and Solsperse 22000 (azo pigment derivative) available from the Lubrizol Corporation, BYK-SYNERGIST 2100 (phthalocyanine pigment derivative) and BYK-SYNERGIST 2105 (yellow pigment derivative) available from BYK-Chemie Japan K.K., EFKA 6745 (phthalocyanine pigment derivative) and EFKA 6750 (azo pigment derivative) available from BASF Japan Ltd., and Synergist Yellow-8020, 8404, 9043, 4827 (yellow pigment derivative); Synergist Red-3953, 4327, 4474, 4858, 4966, 5507, 5525, 5909, 6006, 6547 (azo pigment derivative); Synergist Blue-6831, 7215, 7438, 7854, 0785, 0785A (phthalocyanine pigment derivative); and Synergist Violet-6965, 7349, 7572, 7988 (phthalocyanine pigment derivative) available from Disper Material R & D Corp. One type of these may be used alone, or two or more types of these may be used in combination.

The content of these synergists in the colored resin particle is preferably variable based on the pigment type to be used and the used amount thereof, and from the perspective of suitably exhibiting blending effect of the synergist and effect of the present disclosure, the pigment and the synergist to be used are preferably contained in a certain blending ratio. The mass ratio of synergist/pigment is preferably 0.01 to 0.2, and more preferably 0.05 to 0.15. By setting the mass ratio of synergist/pigment to 0.01 or greater, the pigment is less likely to be shed from the colored resin particle. On the other hand, by setting the mass ratio to 0.2 or less, aggregation of the pigment in the colored resin particle is suppressed, and deterioration of the feeling of writing is suppressed.

The colored resin particle (A) of the present disclosure can be produced by microencapsulating a material containing at least the pigment (a) described above or a material containing at least the pigment (a) and the synergist described above in a manner that a predetermined particle size is achieved.

Examples of the microencapsulation method include interfacial polymerization, interfacial polycondensation, in situ polymerization, in-liquid curing coating, phase separation from an aqueous solution, phase separation from an organic solvent, melt dispersion cooling, air suspension coating, and spray drying.

Preferably, from the perspective of ease of production and quality, a resin component (shell component) forming a microcapsule is preferably a thermosetting resin such as an epoxy resin, urethane, urea, or urea-urethane. Particularly, a urethane-based resin, such as urethane, urea, or urea-urethane is preferable because the microcapsule can accommodate large amounts of the components, the types of the components contained therein are less limited, and it results in excellent redispersibility.

The urethane (polyurethane resin), urea (polyurea resin), and urea-urethane (polyurea resin/polyurethane resin) used in the formation of the shell layer are formed by reacting an isocyanate component and an amine component, an alcohol component, or the like. Furthermore, the epoxy resin used in the formation of the shell layer is formed by reacting with a curing agent such as an amine component.

Examples of the isocyanate component that can be used include 2,4-tolylene diisocyanate, 2,6-tolylene diisocyanate, diphenylmethane diisocyanate, polymeric diphenylmethane diisocyanate, hydrogenated diphenylmethane diisocyanate, 1,5-naphthalene diisocyanate, 3,3'-dimethyldiphenyl-4,4'-diisocyanate, hexamethylene diisocyanate, isophorone diisocyanate, m-phenylene diisocyanate, p-phenylene diisocyanate, trans-cyclohexane 1,4-diisocyanate, diphenyl ether diisocyanate, xylylene diisocyanate, hydrogenated xylylene diisocyanate, 2,6-diisocyanate caproic acid, tetramethyl-m-xylylene diisocyanate, tetramethyl-p-xylylene diisocyanate, trimethylhexamethylene diisocyanate, triphenylmethane triisocyanate, tris (isocyanatephenyl) thiophosphate, isocyanate alkyl 2,6-diisocyanate capronate, 1,6,11-undecane triisocyanate, 1,8-diisocyanate-4-isocyanatemethyloctane, 1,3,6-hexamethylene triisocyanate, and bicycloheptane triisocyanate.

Furthermore, examples of the isocyanate component include diisocyanates such as m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethoxy-4,4-biphenyl-diisocyanate, 3,3'-dimethylphenylmethane-4,4'-diisocyanate, xylylene-1,4-diisocyanate, 4,4'-diphenylpropane diisocyanate, trimethylene diisocyanate, hexamethylene diisocyanate, propylene-1,2-diisocyanate, butylene-1,2-diisocyanate, cyclohexylene-1,2-diisocyanate, and cyclohexylene-1,4-diisocyanate; triisocyanates such as 4,4',4"-triphenylmethane triisocyanate and toluene-2,4,6-triisocyanate; tetraisocyanates such as 4,4'-dimethyldiphenylmethane-2,2',5,5'-tetraisocyanate; and isocyanate prepolymers such as adduct of hexamethylene diisocyanate and trimethylolpropane, adduct of 2,4-tolylene diisocyanate and trimethylolpropane, adduct of xylylene diisocyanate and trimethylolpropane, and adduct of tolylene diisocyanate and hexanetriol. These isocyanate components may be used alone or as a mixture.

Specific examples of the amine component that can be used include aliphatic amines such as ethylene diamine, hexamethylene diamine, diaminocyclohexane, piperazine, diethylenetriamine, triethylenetetramine, tetraethylenepentamine, iminobispropylamine, diaminoethyl ether, 1,4-diaminobutane, pentamethylenediamine, 2-methylpiperazine, 2,5-dimethylpiperazine, 2-hydroxytrimethylenediamine, diethylaminopropylamine, diaminopropylamine, diaminopropane, 2-methylpentamethylenediamine, and xylenediamine; and m-phenylenediamine, triaminobenzene, 3,5-tolylenediamine, diaminodiphenylamine, diaminonaphthalene, t-butyltoluenediamine, diethyltoluenediamine, and diaminophenol. Among these amine components, aromatic amines such as phenylenediamine, diaminophenol, and triaminobenzene are preferable.

Specific examples of the alcohol component that can be used include polyols having two or more hydroxyl groups, such as ethylene glycol, 1,3-propanediol, 1,4-butanediol, 1,5-pentanediol, 1,6-hexanediol, glycerin, catechol, resorcinol, and hydroquinone. These alcohol components may be used alone or as a mixture. Furthermore, the alcohol component and the amine component may be mixed for use.

For the formation of the shell layer from a urethane-based resin of urethane, urea, or urea-urethane, the shell layer can be formed, for example, by 1) performing interfacial polymerization by dispersing a monomer component of at least one of urethane, urea or urethane-urea, and a pigment component, or by a production method 2) including an emulsification step of dispersing an oily component (oily phase) containing an isocyanate component into an aqueous solvent (aqueous phase) to prepare an emulsified liquid, and an interfacial polymerization step of performing interfacial polymerization by adding, to the emulsified liquid, at least one of the amine component or the alcohol component.

In the above production method 2), a solvent can be used in the preparation of the emulsified liquid. For example, phenyl glycol, benzyl alcohol, ethylene glycol monobenzyl ether, ethyl acetate, alkylsulfonic acid phenyl ester, ethylhexyl phthalate, tridecyl phthalate, ethylhexyl trimellitate, diethylene glycol dibenzoate, dipropylene glycol dibenzoate, and a liquid xylene resin can be used. These solvents may be used alone or as a mixture.

On the other hand, a protective colloid may be included in advance in the aqueous phase that is used to emulsify the oily phase. A water-soluble polymer can be used as the protective colloid, and can be appropriately selected from among known anionic polymers, nonionic polymers, and amphoteric polymers. Particularly preferably, polyvinyl alcohol, gelatin, and a cellulose polymer compound are contained.

The aqueous phase may also contain a surfactant. The surfactant can be one appropriately selected from among anionic and nonionic surfactants, which does not act on the protective colloid so as to cause precipitation or aggregation. Preferred surfactants may include sodium alkylbenzene sulphonate (e.g., sodium lauryl sulfate), sodium dioctyl sulfosuccinate, and polyalkylene glycol (e.g., polyoxyethylene nonylphenyl ether). After the oily phase made in the manner as described above is added to the aqueous phase, and emulsified using mechanical force, the temperature of the system is increased as necessary, thereby interfacial polymerization is caused at the oily droplet interface, so that particles can be formed. In addition, desolvation can be performed at the same time as, or after the end of, the interfacial polymerization reaction.

After the interfacial polymerization reaction and desolvation, the particles are separated from the aqueous phase, washed and then dried to provide capsule particles.

Furthermore, the epoxy resin used in the formation of the shell layer is formed by reacting with a curing agent such as the amine component or the like, and can be formed using each of the microencapsulation methods described above, for example, by interfacial polymerization. Usable epoxy resins are epoxy resins having two or more epoxy groups in one molecule, and can be commonly used ones without being limited in molecular weight, molecular structure, or the like. Examples thereof include aromatic epoxy resins such as bisphenol A epoxy resins such as bisphenol A diglycidyl ether epoxy resin, bisphenol F epoxy resins, novolac epoxy resins, cresol novolac epoxy resins, and biphenyl epoxy resins; naphthalene type polyfunctional epoxy resins; glycidyl ether epoxy resins of polycarboxylic acids; glycidyl ester epoxy resins of the same; alicyclic epoxy resins obtained by epoxidation of cyclohexane derivatives such as cyclohexane polyether epoxy resin and hydrogenated bisphenol A epoxy resin; and cycloaliphatic epoxy resins such as dicyclopentadiene epoxy resins. These epoxy resins can be used alone, or two or more thereof can be mixed for use.

In the present disclosure, for formation of the colored resin particles, a dispersant is preferably used together with the pigment described above or the pigment and the synergist described above.

Examples of the dispersant that can be used include AJISPER PB821, AJISPER PB822, and AJISPER PB711 (all available from Ajinomoto Fine-Techno Co., Inc.), DISPARLON DA-705, DISPARLON DA-325, DISPARLON DA-725, DISPARLON DA-703-50, and DISPARLON DA-234 (available from Kusumoto Chemicals, Ltd.), DISPERBYK-111, DISPERBYK-2000, DISPERBYK-2001, DISPERBYK-2020, DISPERBYK-2050, and DISPERBYK-2150 (available from BYK-Chemie Japan K.K.), EFKA4010, EFKA4009, EFKA4015, EFKA4047, EFKA4050, EFKA4055, EFKA4060, EFKA4080, and EFKA4520 (available from BASF Japan Ltd.), and TEGO Dispers 655, TEGO Dispers 685, and TEGO Dispers 690 (available from Evonik Japan Co., Ltd.), further, other products that are commonly known and commercially available as dispersants can be also used. The dispersant is not limited to the examples described above.

The content of the dispersant in the colored resin particle is variable in accordance with the type of pigment and synergist to be used, and from the perspective of suitably exhibiting synergistic action of the pigment and the synergist and effect of the present disclosure, the content is preferably 2 to 20 mass %, and more preferably 3 to 15 mass %.

In the present disclosure, byway of forming a shell layer by the forming means described above, a colored resin particle comprising a microcapsule pigment encapsulating at least the pigment (a) or a colored resin particle (A) comprising a microcapsule pigment encapsulating at least the pigment (a) and the synergist is obtained.

In the present disclosure, at least the content of the pigment and the content of the synergist in the case where the synergist is used vary from the perspective of optionally controlling dispersibility, specific gravity, and particle diameter and also from the perspective of color development. However, the aqueous phase component (water, PVA) and the oil phase component (solvent) used during the production do not substantially remain when colored resin particles are formed. Thus, through polymerizing the raw materials used during the production of the colored resin particles (e.g., pigment, synergist, dispersant, and resin component) by adjusting the pigment, the synergist, the dispersant, and the resin component (balance) to be in the preferred ranges, colored resin particles having these components in the predetermined preferred ranges described above can be obtained.

Furthermore, in the present disclosure, the colored resin particle (A) comprising a microcapsule pigment encapsulating at least the pigment and the like can be adjusted to have a predetermined average particle diameter, such as an average particle diameter of 0.1 to 30 μm, in accordance with the purpose of the writing instrument (ballpoint pen, marking pen), and preferably a range of 0.5 to 20 μm so as to satisfy practical usability for the purposes described above.

In the present disclosure (including Examples described below), "average particle size" refers to the value of the particle size (D50) at 50% cumulative volume in the particle size distribution calculated based on the volume measured by a laser diffraction method. Here, the measurement of average particle size by a laser diffraction method can be performed using, for example, a particle size distribution analyzer HRA 9320-X100 which is available from Nikkiso Co., Ltd.

<Aqueous Ink Composition for Writing Instrument>

The aqueous ink composition for writing instruments of the present disclosure is characterized in that it contains at least the pigment (a) and the colored resin particles (A) encapsulating the pigment (a), and is used, for example, as an aqueous ink composition for a writing instrument such as an aqueous ballpoint pen or marking pen.

In the present disclosure, the content of the colored resin particles (A) having the characteristics described above is preferably 5 to 25 mass %, and more preferably 10 to 20 mass %, with respect to the total amount of the aqueous ink composition for writing instruments. When the content of the colored resin particles is less than 5 mass %, coloring strength is insufficient and visibility of a drawn line decreases. On the other hand, the content of greater than 20 mass % is not preferable because the viscosity increases and fluidity of the ink may be deteriorated.

In the present disclosure, the content ratio of the pigment (a) to the colored resin particles (A) having the characteristics described above [(a)/(A)] is preferably 0.02 to 0.5 by mass from the perspectives of exhibiting more the effect of the present disclosure and preventing destabilization of the ink due to aggregation of the pigment (a) and the colored resin particles (A) over time.

The aqueous ink composition for writing instruments of the present disclosure contains a water-soluble solvent in addition to the pigment (a) and the colored resin particles (A) having the characteristics described above. Furthermore, as necessary, a general colorant besides the pigment (a) and the colored resin particles (A) having the characteristics described above can be optionally contained as far as the effects of the present disclosure would not be impaired.

Examples of the water-soluble solvent to be used include glycols such as ethylene glycol, diethylene glycol, triethylene glycol, propylene glycol, polyethylene glycol, and glycerin; ethylene glycol monomethyl ether, and diethylene glycol monomethyl ether. These solvents may be used alone or as a mixture. The content of the water-soluble solvent is preferably 5 to 40 mass % based on the total amount of the aqueous ink composition for writing instruments.

As the colorant that can be used, a water-soluble dye, hollow resin particles having voids within the particles (used as a white pigment) or resin particles (pseudo-pigment) dyed with a basic dye having excellent color development and dispersibility, or the like can be used in an appropriate amount, for example, within a range in which the effects of the present disclosure would not be impaired.

For the water-soluble dye, a direct dye, an acid dye, an edible dye, or a basic dye can be used in an appropriate amount within a range in which the effects of the present disclosure would not be impaired.

The Aqueous Ink Composition for Writing Instruments of the Present Disclosure

Besides the pigment (a), the colored resin particles (A) having the characteristics described above, colorants besides the colored resin particles, and the water-soluble solvent, besides water for a solvent as the balance (e.g., tap water, purified water, distilled water, ion exchanged water, or purified water), the aqueous ink composition for writing instruments of the present disclosure can appropriately contain a dispersant, a lubricant, a pH adjuster, a corrosion inhibitor, a preservative or an antibacterial agent, a thickener, or the like, within a range in which the effects of the present disclosure would not be impaired.

Examples of the dispersant that can be used include nonionic and anionic surfactants, and water-soluble resins. Preferably, a water-soluble polymer is used.

The dispersant is not particularly limited, and a known dispersant can be used as well as a dispersant that can be obtained from a known raw material by a known method can be used.

Examples of the lubricant include, but are not limited to, non-ionic types such as fatty acid esters of polyhydric alcohols, higher fatty acid esters of sugars, polyoxyalkylene higher fatty acid esters, and alkyl phosphate esters; anionic types such as alkyl sulfonates of higher fatty acid amides and alkyl allyl sulfonates; derivatives of polyalkylene glycols, fluorochemical surfactants, and polyether modified silicones, which are also used as surface treating agents for pigments.

Examples of the pH adjuster include ammonia, urea, monoethanolamine, diethanolamine, triethanolamine, alkali metal salts of carbonic acid and phosphoric acid such as sodium tripolyphosphate and sodium carbonate, and alkali metal hydroxides such as sodium hydroxide. Examples of the corrosion inhibitor include benzotriazole, tolyltriazole, dicyclohexylammonium nitrite, and saponins. Examples of the preservative or antibacterial agent include phenol, omadine sodium, sodium benzoate, thiazoline compounds, and benzimidazole compounds. Examples of the thickener include carboxymethylcellulose (CMC) or salts thereof, fermented cellulose, crystalline cellulose, and polysaccharides. Examples of the polysaccharides that can be used include xanthan gum, guar gum, hydroxypropylated guar gum, casein, gum arabic, gelatin, amylose, agarose, agaropectin, arabinan, curdlan, callose, carboxymethyl starch, chitin, chitosan, quince seed, glucomannan, gellan gum, tamarind seed gum, dextran, nigeran, hyaluronic acid, pustulan, funoran, HM pectin, porphyran, laminaran, lichenan, carrageenan, alginic acid, tragacanth gum, alkasy gum, succinoglycan, locust bean gum, and tara gum. These polysaccharides may be used alone, or two or more thereof may be used in combination. Commercially available products of these, if present, can be used.

The aqueous ink composition for writing instruments of the present disclosure can be prepared by appropriately combining the pigment (a) and the colored resin particles (A) having the characteristics described above, the water-soluble solvent, and other components, depending on the application of the ink for writing instruments (e.g., for ballpoint pens, marking pens), and then mixing those by stirring using a stirrer such as a homomixer, a homogenizer or a disperser, and as necessary, further filtering or centrifuging the mixture to remove coarse particles in the ink composition.

The aqueous ink composition for writing instruments of the present disclosure is loaded in a ballpoint pen, a marking pen, or the like provided with a pen tip such as a ballpoint pen tip, a fiber tip, a felt tip, or a plastic tip.

The ballpoint pen of the present disclosure includes an instrument where in an ink container (refill) for a ballpoint pen accommodated are the aqueous ink composition for writing instruments having the above-mentioned composition and, as an ink follower, a material that is not soluble with the aqueous ink composition accommodated in the ink container and has a smaller specific gravity than the aqueous ink composition, for example, polybutene, silicone oil, and mineral oil. For example, the ballpoint pen can be produced by filling the aqueous ink composition for writing instruments in an aqueous ballpoint pen body including a ballpoint pen tip having a ball with a diameter of 0.18 to 2.0 mm.

Note that the structures of the ballpoint pen and the marking pen are not particularly limited, and the ballpoint pen and the marking pen may be, for example, a direct liquid type pen provided with a collector structure (ink holding mechanism) using a shaft cylinder itself as an ink container in which the shaft cylinder is filled with the aqueous ink composition for writing instruments having the formulation described above.

In addition, a pH level (at 25° C.) of the aqueous ink composition for writing instruments of the present disclosure is adjusted to preferably 5 to 10, further preferably 6 to 9.5, by means of a pH adjuster or the like from the perspective of usability, safety, stability of the ink itself, and matching with the ink container.

The aqueous ink composition for writing instruments of the present disclosure composed as described above can be provided by using a combination of at least the pigment (a) and the colored resin particles (A) containing the pigment (a) inside, and the resulting ink is not repelled when writing is performed on a paper face attached with hand grease or the like, and achieves a uniform density in a drawn line and excellent writing capability.

EXAMPLES

Next, the present disclosure will be described in more detail using Production Examples, Examples, and Comparative Examples, but the present disclosure is not limited to the following Examples. Note that the unit "part" in the following Production Examples means "part by mass". Colored resin particles (A) to be used were produced by Production Examples 1 and 2 below.

Production Example 1: Production of Colored Resin Particle (A)-1

While an oil phase solution of 11.6 parts of ethylene glycol monobenzyl ether and 1.8 parts of dispersant (DIS- PERBYK-ill, available from BYK-Chemie Japan K.K.) was heated to 60° C., 2.0 parts of a pigment (carbon black, Cabot Mogul L, available from Cabot Corporation) and 0.2 parts of a synergist (phthalocyanine pigment derivative, Solsperse 5000, available from The Lubrizol Corporation) were added and adequately dispersed. Next, 9.0 parts by mass of a trimethylolpropane adduct of xylylene diisocyanate (TAK-ENATE D110N, available from Mitsui Chemicals, Inc.) as a prepolymer was added, and an oil phase solution was prepared. As an aqueous phase solution, while 600 parts by mass of distilled water was heated to 60° C., 15 parts by mass of polyvinyl alcohol (PVA-205, available from Kuraray Co., Ltd.) as a dispersant was dissolved in it, and thus an aqueous phase solution was prepared.

The oil phase solution was added to the water phase solution at 60° C., and stirred with a homogenizer for 6 hours for emulsion polymerization, thus completing polymerization. By subjecting the obtained dispersion to centrifugation, colored resin particles (A)-1 were obtained. The average particle diameter (D50) of the colored resin particles (A)-1 was 2.1 μm.

Production Example 2: Production of Other Colored Resin Particle (A)-2

Colored resin particles (A)-2 were obtained in the same manner as in Production Example 1 except that the amount of the dispersant (DISPERBYK-111, available from BYK-Chemie Japan K.K.) of Production Example 1 was 3.2 parts and the synergist (phthalocyanine pigment derivative, Solsperse 5000, available from The Lubrizol Corporation) was not added. The average particle diameter (D50) of the colored resin particles (A)-2 was 2.7 μm.

Examples 1 to 3 and Comparative Examples 1 and 2: Marking Pen Each aqueous ink composition for writing instruments (marking pen) was prepared by an ordinary method using the blending composition listed in Table 1 below.

For the aqueous ink compositions for writing instruments obtained in Examples 1 to 3 and Comparative Examples 1 and 2 described above, marking pens were made by the following method, and writing capabilities on a paper face to which hand grease was attached were evaluated by the following evaluation method.

These results are shown in Table 1 below.
Preparation of Marking Pen
Each of the obtained ink compositions was filled in a marking pen [available from Mitsubishi Pencil Co., Ltd., PM-120T, pen core: ultra-fine core (POM resin), fine round core (PET fibers), ink absorber (PET fibers)].

Evaluation Method of Writing Capability on Paper Attached with Hand Grease
Preparation of Hand Grease Paper
An artificial hand grease prepared by the following formulation was uniformly coated on test paper described in 7.3 of JIS S 6061:2010 and then adequately dried at room temperature, and thus test paper was prepared.
Artificial Hand Grease Formulation
Squalane 3 mass %
Isopropyl myristate 6 mass %
Olive oil 12 mass %
Cholesterol 0.5 mass %
Palmitic acid 0.5 mass %
Oleic acid 4 mass %
Isostearic acid 4 mass %
Acetone 70 mass %

11

Using the resulting marking pen in which each of the ink compositions was filled as described above, 10 circles having a diameter of 4 cm were continuously drawn on the test paper, and sensory evaluation was performed based on the following evaluation criteria.

Evaluation Criteria

A: Drawing was completely performed.

B: Undrawn portions as long as greater than 0 mm and 20 mm or less in total were observed.

C: Undrawn portions as long as greater than 20 mm were observed.

Examples 4 to 7 and Comparative Examples 3 and 4: Aqueous Ballpoint Pen Each aqueous ink composition for writing instruments (ballpoint pen) was prepared by an ordinary method using the blending composition listed in Table 2 below.

For the aqueous ink compositions for writing instruments (ballpoint pens) obtained in Examples 4 to 7 and Comparative Examples 3 and 4 described above, aqueous ballpoint pens were made by the following method, and writing capabilities on a paper face to which hand grease was attached were evaluated by the evaluation method described above (using the ballpoint pen in place of the marking pen).

These results are indicated in Table 2 below.

Preparation of Aqueous Ballpoint Pen

Aqueous ballpoint pens were made using each of the obtained ink compositions. Specifically, using a holder of a ballpoint pen (trade name: SIGNO UM-100, available from Mitsubishi Pencil Co., Ltd.), a refill including an ink storage tube made of polypropylene having an inner diameter of 4.0 mm and a length of 113 mm, a stainless steel tip (superalloy ball, ball diameter: 0.7 mm) and a joint connecting the storage tube and the tip was filled with each of the aqueous inks described above, and an ink follower composed mainly of a mineral oil was provided at the rear end of the ink, thus making an aqueous ballpoint pen.

TABLE 1

(Total amount: 100 mass %)

|  |  |  | Examples | | | Comparative Examples | |
|---|---|---|---|---|---|---|---|
|  |  |  | 1 | 2 | 3 | 1 | 2 |
| Pigment (a) [carbon black] |  |  | 2 | 1 | 0.2 |  |  |
| Colored resin particle (A)-1 encapsulating pigment (a) | Production Example 1 |  | 18 |  | 15 | 28 |  |
| Colored resin particle (A)-2 encapsulating pigment (a) | Production Example 2 |  |  | 15 |  |  | 15 |
| Resin | Styrene acryl | Joncryl 63J (solid content: 30%) (available from BASF Japan Ltd.) | 10 | 10 | 10 | 10 | 10 |
| pH modifier | Aminomethyl Propanol |  | 1 | 1 | 1 | 1 | 1 |
| Surface tension modifier | Fluorosurfactant | Capstone FS-30 (solid content: 25%) (available from the Chemours Company) | 0.05 | 0.05 | 0.05 | 0.05 | 0.05 |
| Antifoaming agent | Silicone surfactant | KM-90 (active ingredient: 34%) (available from Shin-Etsu Chemical Co., Ltd.) | 0.1 | 0.1 | 0.1 | 0.1 | 0.1 |
| Antibacterial agent | Na benzoate |  | 0.1 | 0.1 | 0.1 | 0.1 | 0.1 |
| Water | Distilled water |  | Balance | Balance | Balance | Balance | Balance |
| Writing capability on paper face to which hand grease was attached |  |  | A | A | B | C | C |

TABLE 2

(Total amount: 100 mass %)

|  |  |  | Examples | | | | Comparative Examples | |
|---|---|---|---|---|---|---|---|---|
|  |  |  | 4 | 5 | 6 | 7 | 3 | 4 |
| Pigment (a) [carbon black] |  |  | 1.5 | 1.2 | 0.2 | 0.3 |  |  |
| Colored resin particle (A)-1 encapsulating pigment (a) | Production Example 1 |  | 14 |  | 15 |  | 16 |  |
| Colored resin particle (A)-2 encapsulating pigment (a) | Production Example 2 |  |  | 15 |  | 16 |  | 15 |
| Thickener | Xanthan gum | KELZAN S (available from Sansho Co., Ltd.) | 0.32 | 0.32 | 0.32 | 0.32 | 0.32 | 0.32 |

TABLE 2-continued

| | | | (Total amount: 100 mass %) | | | | | |
|---|---|---|---|---|---|---|---|---|
| | | | Examples | | | | Comparative Examples | |
| | | | 4 | 5 | 6 | 7 | 3 | 4 |
| Pigment Dispersant | Styrene acryl | Joncryl 63J (solid content: 30%) (available from BASF Japan Ltd.) | 6 | 6 | 6 | 6 | 6 | 6 |
| pH Modifier | Triethanolamine | | 1.4 | 1.4 | 1.4 | 1.4 | 1.4 | 1.4 |
| Corrosion inhibitor | Benzotriazol | | 0.3 | 0.3 | 0.3 | 0.3 | 0.3 | 0.3 |
| Preservative | Benzisothiazoline | Bioden 421 (available from Daiwa Chemical Ind. Co., Ltd.) | 0.2 | 0.2 | 0.2 | 0.2 | 0.2 | 0.2 |
| Lubricant | Phosphate | RD-510Y (available from Toho Chem. Ind. Co., Ltd.) | 0.5 | 0.5 | 0.5 | 0.5 | 0.5 | 0.5 |
| Solvent | Propylene glycol | | 15 | 15 | 15 | 15 | 15 | 15 |
| Water | Distilled water | | Balance | Balance | Balance | Balance | Balance | Balance |
| Writing capability on paper face to which hand grease was attached | | | A | A | B | B | C | C |

As is clear from the results in Table 1 and Table 2 above, it was confirmed that the aqueous ink compositions for writing instruments (marking pens, ballpoint pens) of Examples 1 to 7 within the scope of the present disclosure were aqueous ink compositions for writing instruments which are not repelled when the ink is used to write on a paper face attached with hand grease or the like and achieve uniform density in a drawn line and excellent writing capability compared to those of Comparative Examples 1 to 4 outside of the scope of the present disclosure.

INDUSTRIAL APPLICABILITY

The aqueous ink composition for writing instruments suitable for, for example, an aqueous ballpoint pen and a marking pen is obtained.

The invention claimed is:

1. A writing instrument comprising an aqueous ink composition, the aqueous ink composition comprising:
an unencapsulated pigment (a); and
colored resin particles (A) encapsulating a pigment of the same kind as the unencapsulated pigment (a) and a synergist of the pigment in the colored resin particles (A),
wherein the unencapsulated pigment (a) is present in a range of from 0.1 to 8 mass % with respect to a total aqueous ink composition mass,
wherein an (a)/(A) content ratio of the unencapsulated pigment (a) to the colored resin particles (A) encapsulating the pigment is in a range of from 0.02 to 0.4 by mass, and
wherein the pigment is a carbon black and the synergist is a phthalocy anine pigment derivative.

2. The writing instrument of claim 1, wherein a resin component of the colored resin particles (A) is urethane-based.

3. The writing instrument of claim 1, comprising the unencapsulated pigment (a) in a range of from 0.2 to 4.0 mass %, with respect to the total aqueous ink composition mass.

4. The writing instrument of claim 1, comprising the unencapsulated pigment (a) in a range of from 0.5 to 4.0 mass %, with respect to the total aqueous ink composition mass.

5. The writing instrument of claim 1,
wherein a mass ratio of the synergist to the pigment in in the colored resin particle (A) is in a range of from 0.01 to 0.2.

6. The writing instrument of claim 1, comprising:
wherein a mass ratio of the synergist to the pigment in the colored resin particle (A) is in a range of from 0.05 to 0.15.

7. The writing instrument of claim 1,
wherein the writing instrument is a marking pen.

* * * * *